Figure 1:
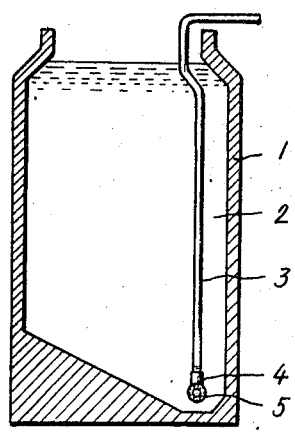

United States Patent [15] 3,644,231
Maruya et al. [45] Feb. 22, 1972

[54] POROUS MEMBER FOR DIFFUSING AIR AND PROCESS FOR PRODUCING THE SAME

[72] Inventors: Mitsuru Maruya, Tokyo; Yoshio Oono; Bunji Fukuda, both of Ichikawa; Kenji Takahashi, Tokyo, all of Japan

[73] Assignee: Kanegafuchi Boseki Kabushiki Kaisha, Tokyo, Japan

[22] Filed: Mar. 1, 1968

[21] Appl. No.: 709,775

[52] U.S. Cl. .................. 260/2.5 F, 260/17.2 S, 260/17.3 S, 260/17.4 ST, 260/17.4 SG, 260/836, 260/837, 260/838, 260/849, 261/122
[51] Int. Cl. ........................................ C08j 1/16, C08j 1/18
[58] Field of Search ................................................ 260/2.5 F

[56] References Cited

UNITED STATES PATENTS 2,876,085  3/1959  Horie ................................... 260/2.5 F Primary Examiner—Murray Tillman
Assistant Examiner—Morton Foelak
Attorney—Wenderoth, Lind & Ponack

[57] ABSTRACT

The invention relates to a method of foaming a solution of a polyvinyl acetal resin containing a foaming agent and thereafter impregnating said foam with a precondensate or monomer of curable resin. The final product is used as a member for diffusing gas.

10 Claims, 7 Drawing Figures

PATENTED FEB 22 1972 3,644,231

MITSURU MARUYA,
YOSHIO OONO,
BUNJI FUKUDA,
AND KENJI TAKAHASHI,
Inventors

By Wenderoth, Lind & Ponack.
Attorneys

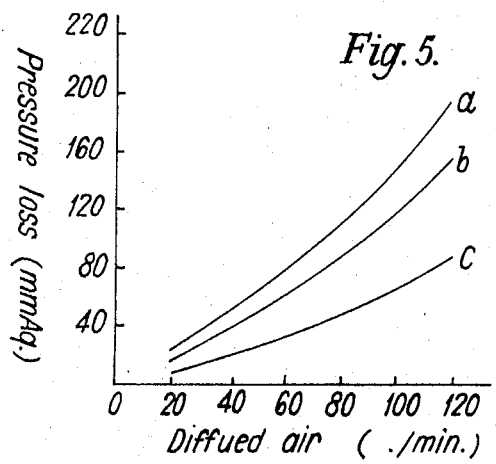
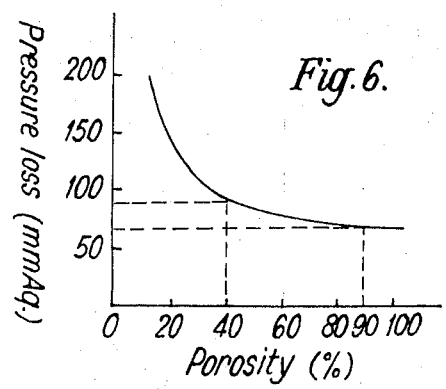
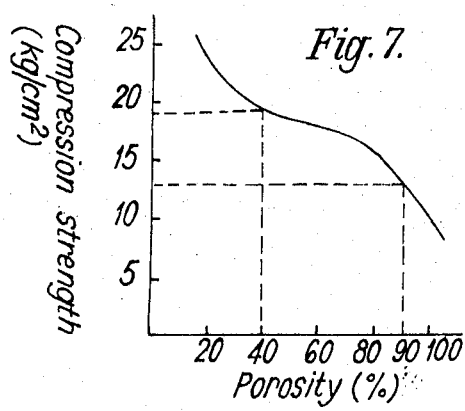

POROUS MEMBER FOR DIFFUSING AIR AND PROCESS FOR PRODUCING THE SAME

This invention relates to an improved porous air diffuser member and also to a method for producing the same.

Generally a gas (e.g., air, inert gas) diffuser is used in sewage-treating apparatus, flotation system separator, fermenting apparatus or chemical treating apparatus requiring the contact and mixing and diffusion of such gas with and into a liquid.

For example, the active sludge method sewage treatment so called in the present specification is a method of decomposing organic substances in sewage by the oxidizing action of aerobic micro-organisms which require oxygen in air. When sewage is put into an aerating tank and air is fed to the sewage by means of a diffuser while an active sludge (which is a gelly sludge containing the aerobic micro-organisms) is being added, organic substances in the sewage will be adsorbed by the active sludge and will be decomposed into water, carbon dioxide, ammonia, etc., by the oxidizing action of the aerobic micro-organisms and consequently the sewage will be cleaned. Playing the most important part in this system is the diffuser for air.

Further, in the flotation system separator, the phenomena of the adsorption of solids by fine bubbles is utilized. Therefore, there must be used a diffuser generating uniform and fine gas bubbles.

In the art of tank or deep fermentation wherein micro-organisms are grown, there is required a diffuser which can diffuse air in the fermentation system with a high efficiency.

Further, in certain chemical treating apparatus, a diffuser is indispensable to the diffusion of inert gases to conduct uniform gas-liquid reaction process or to prevent undesirable oxidization.

In each of these cases it is usual to employ a diffusing member in the form of tube, sheet, plate or the like through which air or gas is diffused into liquid system. For such diffusing member there has conventionally been used a porous body made of a ceramic material. However, it has defects that it is high in the pressure loss in the case of diffusing air so that the power consumption will be large. Another drawback of such porous ceramic body is that it is high in weight so that it is inconvenient in handling.

A diffuser made of a synthetic fiber fabric is known, but, it is low in strength and durability.

It is also known to employ a porous body of a vinyl chloride resin as a diffusing member, but the pores are not satisfactorily uniform so that uniform bubbles can not be generated.

An air-diffusing tube made of a pearl polymerization resin (for example, an acrylonitrile-styrene copolymer) is also known, but it is weak against impact and fragile. Further, an air-diffusing tube made of a sintered metal is expensive and is difficult in handling because of heaviness.

There is also known to employ a diffusing member made of a porous body of polyvinyl acetal resin. While this material is satisfactory to some extent, conventional polyvinyl acetalic porous body had characteristics that its hydrophilicity is so different depending on its acetalization degree that, when the acetalization degree is about 60 percent (mol), it will be soft when wet but, when the degree is above 80 percent (mol), it will be hard even when wet. Further, there is a great defect that, even at such high acetalization degree as 85 percent (mol) which is close to the theoretical maximum acetalization degree, the practical water-resistant strength, that is, the water-resistant stability is low. Therefore, the conventional polyvinyl acetalic porous body is not suitable for an air-diffusing tube to be used as dipped in water.

We have found that a polyvinyl acetalic porous body can be modified to be more suitable as a gas (or air) diffuser member.

Briefly, the porous body or member (tube, sheet, plate or the like) for diffusing air of the present invention comprises a mass of polyvinyl acetal of an acetalization degree of 60-85 percent (mol) and further contains 15-150 percent by weight (based on the polyvinyl acetal) of at least one selected from the group consisting of phenol-formaldehyde resins, melamine-formaldehyde resins, urea-formaldehyde resins and epoxy resins, said porous body having continuous or open fine pores with a porosity of 40-90 percent.

The features of the improved air-diffusing porous member of the present invention are as follows:

1. it is a porous body made of a polyvinyl acetal modified with the above-mentioned synthetic resin and having continuous fine pores,
2. it is high in mechanical properties, particularly in compressive strength and flexibility, and the defects of the conventional polyvinyl acetalic porous body are remarkably overcome,
3. it is light in weight but is tough,
4. it is a porous body having continuous uniform fine pores, and accordingly uniform fine bubbles (such as of air) can be produced therethrough in a liquid tank. Further the pressure loss by the air-diffusing member itself is low so that the power consumption is low, and
5. it is easy to make and is low in price.

The porous body of this invention may be produced by any of the following two methods.

A. An aldehyde, acetalizing catalyst and pore-producing agent are mixed together with an aqueous solution of a polyvinyl alcohol, and acetalization is effected. The resulting polyvinyl acetalic porous body is impregnated with a precondensate or monomer of a phenol-formaldehyde resin, melamine-formaldehyde resin, urea-formaldehyde resin or epoxy resin and a curing catalyst and is then heat treated or not so that the curing reaction (condensing polymerization or ring-opening polymerization) may proceed.

B. The above-mentioned precondensate and curing catalyst are added to the acetalization system and then the curing reaction (condensation-polymerization or ring-opening polymerization) is caused to proceed simultaneously with the acetalization. The resulting porous body may be heat treated if necessary.

In either of these two processes, with the progress of the curing reaction, the precondensate or monomer of said resin will partially react on the hydroxyl groups of the polyvinyl alcohol to form a polyvinyl acetalic porous body chemically modified with said resin. We have found that, by this modification, there is obtained an improved porous member for diffusing air (or gas) in which the defects in the mechanical properties of the conventional polyvinyl acetalic porous body are overcome and which is excellent in performances as an air-diffusing tube or plate.

The polyvinyl alcohol to be used in the present invention may be obtained by saponifying a polyvinyl acetate and is of a residual acetic acid group of 0-10 percent (mol) and of a polymerization degree in the range of 800-2,500.

For the aldehyde to be used, there can be enumerated aliphatic aldehydes such as formaldehyde, acetaldehyde, butylaldehyde, 2-ethylhexylaldehyde, laurylaldehyde and glyoxal, and aromatic aldehydes as benzaldehyde. Among them, formaldehyde is most preferable. The proper amount of use of such aldehyde is 5-15 percent by weight or preferably 8-12 percent by weight on the polyvinyl alcohol.

Examples of catalyst for the acetalizing reaction are hydrochloric acid, sulfuric acid, etc. The catalyst may be used in an amount of 5-25 percent by weight or preferably 10-20 percent by weight based on the acetalizing reaction solution.

The pore-producing agent to be used in the present invention is a substance accelerating and promoting the formation of uniform fine pores in the polyvinyl acetalic porous body. Useful pore-producing agents are amylose-containing polysaccharides such as starch, dextrin and their derivatives, and nonionic and anionic surface active agents. Among them, starch and dextrin are most preferable. The proper amount of such substance is 50-250 percent by weight or preferably 100-200 percent by weight based on the polyvinyl alcohol.

For the precondensate of the melamine-formaldehyde resin to be used in the present invention, there can be enumerated, for example, trimethylolmelamine, tetramethylolmelamine, hexamethylolmelamine and their alkyl etherides.

Examples of the precondensate of the urea-formaldehyde resin are trimethylolated urea, tetramethylolated urea, dimethylolalkylene urea, tetramethylolated acetylene urea, dimethylolated hydroxylalkylene urea and their alkyl etherides.

For the precondensate of the phenol-formaldehyde resin, there can be enumerated resol-type or novolak-type precondensates and precondensates of cresol-formaldehyde resins. The most preferable is a water-soluble resol-type precondensate.

The curing catalysts for curing (condense and polymerize) the above-described precondensates of the melamine-formaldehyde resin. Preferably curing catalysts are urea-formaldehyde resin and phenol-formaldehyde resin well known in the art. Preferable catalysts are acid salts such as magnesium chloride, zinc nitrate, diammonium hydrogen phosphate and hydrochloric acid salt of alkanolamine. The proper amount of use of such catalyst is 5–30 percent by weight or preferably 10–20 percent by weight based on the precondensate employed.

As for precondensates to form the epoxy resin, there may be used, for example, bisphenol-epichlorohydrin precondensates, epoxydated polyolefins, diglycidyl ethers of polyethylene glycols, diglycidyl ethers of polypropylene glycols and diglycidyl ethers of bisphenol A. Further, for the monomers, there can be enumerated 1,10-dimethoxy-3,4,7,8-diepoxydecane and 2,6-diglycidyl phenylglycidyl ether.

For the curing catalysts for these epoxy precondensates and monomers, may be mentioned diethylenetriamine, triethylenetetramine, dimethylaminopropylamine, mono- or di-ethanolamine, boron trifluoride-amine complex compounds, phthalic and maleic anhydrides, amine adduct, dicyanodiamide and polyamides of dimer acids.

Since these precondensates and monomers for forming the various polymers and their curing catalysts are very well known in the art no further detailed explanation thereabout will be required.

By using these materials, air- or gas-diffusing members or bodies may be produced in the following manners according to the invention.

Predetermined amounts of the aldehyde, acetalizing catalyst and pore producing agent are added to an aqueous solution of the above-mentioned polyvinyl alcohol, and the mixture is poured into a reaction vessel or mold of any proper shape (adapted to the shape desired for diffuser). Then acetalizing reaction is conducted at 30°–70° C. or preferably at 40°–60° C. for 10–30 hours. The produced solid polyvinyl acetalic porous body is removed from the mold and washer with water to remove any excess aldehyde, acid and pore producing agent and is then dried. The polyvinyl acetalic porous body thus obtained generally has a porosity of 40–90 percent, an acetalization degree of 60–85 percent (mol) and fine pores.

However, this body is either soft or hard, and swells with water, and is poor in the mechanical properties (for example, strength) when it has absorbed water and when it is dry and therefore cannot be used for air-diffusing tubes and the like.

Therefore, the important feature of this invention is to chemically treat the same to improve the properties. Thus, the dried acetalic porous body obtained as above is dipped in or otherwise impregnated with a solution of a predetermined concentration containing at least one of the above-mentioned precondensates (or monomers) and a curing catalyst therefor. The amount of impregnation is controlled to be in the range of 80–120 percent by weight. If desired, the body may be dried. Thereafter the body is heated (or cured) at 60°–150° C. for a short time. By this treatment, the curing reaction (condensation polymerization or ring opening polymerization) of said precondensate (or monomer) occurs, while, at the same time, the inherent methylol group or epoxy group reacts with the residual hydroxyl group in the polyvinyl acetal to form a polyvinyl acetalic porous body modified by 15–150 percent by weight of the resulting synthetic resin. The resulting porous member is remarkably high in strength even when dipped in water and when dry, and its air diffusing performance is excellent.

In this case, the preferable range of the amount of said synthetic resin to be formed and retained in the porous body is 50–100 percent by weight based on the polyvinyl acetal.

The proper amount of the precondensate (or monomer) of the epoxy resin is about 15–150 percent by weight, preferably 50–100 percent by weight based on the polyvinyl acetal. Further, the amount that of the curing catalyst may be about 5–100 percent by weight based on the precondensate (or monomer). The temperature of the curing reaction (ring-opening polymerization) is 60°–150° C. The reaction time is about 2 to 60 minutes.

In case of the use of precondensate of the phenol-formaldehyde resin, melamine-formaldehyde resin or urea-formaldehyde resin, the proper amount would be 17–170 percent by weight, preferably 60–170 percent by weight based on the polyvinyl acetal. The amount of the curing catalyst may be in the range of 5–30 percent by weight based on the precondensate. The temperature of the curing reaction is usually 110°–150° C. and its time is in the range of about 1–20 minutes.

The thus obtained porous body is ground and shaped into an air-diffusing tube, plate or the like of a shape and size desired in the particular diffuser. Since the material has a proper hardness, the grinding and shaping operations are easy.

Alternatively, the porous diffuser of the present invention may also be produced in the following manner.

Thus, predetermined amounts of aldehyde, acetalizing catalyst and pore-producing agent are added to an aqueous solution of the before-mentioned polyvinyl alcohol. To this mixture is added at least one precondensate (or monomer) for forming epoxy resin, urea-formaldehyde resin, melamine-formaldehyde resin or phenol-formaldehyde resin. In case the precondensate (or monomer) of the epoxy resin is to be mixed into the above solution, 17–170 percent, preferably 60–110 percent by weight of the same based on the solid content (polyvinyl alcohol) in the mixture is added in the form of a solution or dispersion. Further, in case the precondensate of the urea-formaldehyde resin, melamine-formaldehyde resin or phenol-formaldehyde resin is to be mixed into said mixture, 20–200 percent, preferably 70–120 percent by weight of the same based on the polyvinyl alcohol is added in the form of a solution or dispersion. Then the mixture is poured into a reaction vessel or mold of any desired shape and is heated to 30°–70° C., preferably 40°–60° C. for 10 to 30 hours to conduct the acetalization.

In this case, simultaneously with the acetalization, there also proceeds the curing (condensing polymerization or ring-opening polymerization) of said precondensate (or monomer) and a part of the hydroxyl group of the polyvinyl alcohol will react with the epoxy group or methylol group of said precondensate. Thus, there is formed a polyvinyl acetalic porous solid body containing 15–150 percent by weight of said synthetic resin based on the polyvinyl acetal, having an acetalization degree of 60–85 percent by weight and continuous fine pores of a porosity of 40–90 percent.

When the body is removed from the mold, washed with water and dried, there is obtained a porous member for diffusing air remarkably high in mechanical properties even when dipped in water and when dried and excellent in the air-diffusing performance.

The optimum amount of the synthetic resin to be contained in the polyvinyl acetalic porous body is 50–100 percent by weight based on the polyvinyl acetal.

In this process, the acid used as the acetalizing catalyst will serve also as a curing catalyst for the precondensate of said thermosetting resin and therefore it is not necessary to use separate curing catalyst. However, in case of the use of epoxy resin precondensate or monomer, it is necessary to add a curing catalyst mentioned before in an amount of 5-100 percent by weight based on the precondensate or monomer.

The thus obtained porous body is ground, shaped and finished into an air-diffusing tube, plate or the like of a shape adapted to the particular diffuser. Since the material in this case has a proper hardness, it is easy to grind and shape.

Figure 2:
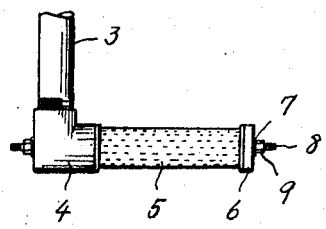
Figure 3:
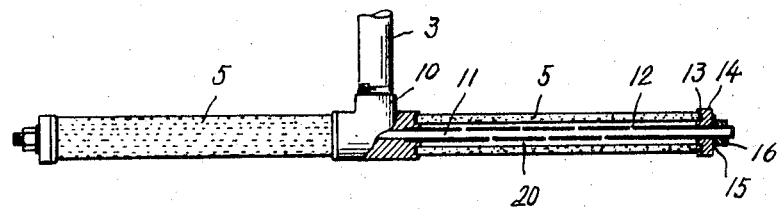
Figure 4:
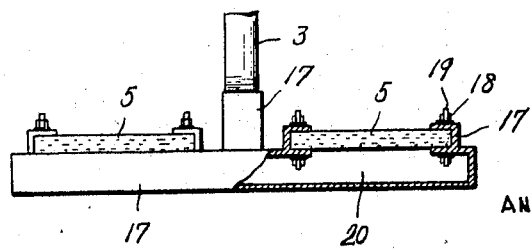

The present invention will be explained in more details partly by referring to the accompanying drawings wherein;

FIG. 1 is a schematic cross section of an aerating tank for the treatment of sewage, provided with an air-diffusing tube, FIG. 2 is a view to show the manner of use of a diffusing tube of FIG. 1, FIG. 3 is a view similar to FIG. 2 but showing another mode of use of a diffusing tube, FIG. 4 is a view to show the mode of use of a diffusing member in the form of plate, FIG. 5 is a graph showing the relation between the volume of diffused air and pressure loss through various air-diffusing tubes, FIG. 6 is a graph showing the relation between the porosity of an air-diffusing tube and the pressure loss therethrough, and FIG. 7 is a graph showing the relation between the porosity of an air-diffusing tube and the compressive strength thereof.

The water resistance and compressive strength (wet and dry) of a porous body of the present invention as compared with those of conventional polyvinyl acetalic porous bodies are as shown in Table 1.

TABLE 1

| Samples | Water resistance [1] | Compressive strength (kg./cm.$^2$) | |
|---|---|---|---|
| | | Dry state | Wet state |
| Polyvinyl acetalic porous body with acetalization degree of 60% (conventional product). | Swelled by 5-10%. | 3.7 | |
| Polyvinyl acetalic porous body with acetalization degree of 85% (conventional product). | Swelled by 1-2%. | 7.4 | 4.2 |
| Porous member of the present invention (Example 1). | Swelled by less than 0.2%. | 15.3 | 13.8 |

[1] Dipped in warm water at 50° C. for 1 month.

The compressive strength was determined by measuring the strength in case a test piece of 20×15 cm. × 40 mm. thick was vertically compressed on the surface of 20×15 cm. to 25 percent (compressed until the 40 mm. thickness became 30 mm.). The sample in the dry state was that left standing for 48 hours in an atmosphere of a relative humidity of 65 percent at 20° C. The sample in the wet state was that dipped in water for 12 hours, then taken out and squeezed to a water content of 100 percent.

As evident from the results shown in Table 1, the air-diffusing member of this invention, even when dipped in water at 50° C. for 1 month, does not substantially swell and has a high-compressive strength. Therefore, in case it is used for an air-diffusing tube in a sewage-treating apparatus, it will show a high durability. Further, the porous member of the present invention is high in the impact strength and is much superior to air-diffusing tubes of a conventional ceramic material and pearl polymerization resin material. For example, when five air diffusing tubes of 70 dia. × 40 dia. × 250 mm. long of each material were naturally dropped in a horizontal state from a height of 1 meter onto a concrete plate of 500×500×50 mm. Among the five air-diffusing tubes made of each of the ceramic material and pearl polymerization resin, three perfectly broke in one drop, but none of the five air-diffusing tubes (Example 1) according to the present invention was broken even in five drops.

The porous member for diffusing air (or gas) of the present invention has such high impact strength as mentioned above and is light in weight so that it has excellent workability in the case of working it into an air-diffusing tube or plate. Further, it is convenient in use and handling.

The characteristics or performances of the air diffuser member of this invention as used in an actual sewage-treating apparatus will be explained below, in comparison with those of the conventional air-diffusing tube made of ceramics and of pearl polymerization resin.

An apparatus as shown in FIG. 1 was employed. An aerating tank 1 for treating sewage was fitted with an air-diffusing tube shown in FIG. 2. The tank 1 made of iron was 2.3 m. high, 1.1 m. wide and 0.55 m. thick and contained 1 cubic meter of sewage 2. It is a so-called spiral-flow-type aerating tank in which air is fed through an air-feeding pipe 3 so that uniform fine air bubbles may be generated through an air-diffusing tube 5 and a spiral flow may be formed in the sewage 2. As shown in FIG. 2, the air-diffusing tube 5 is fitted to a holder 4 and closed by a cover 6. They are secured together by means of a bolt 8, packing 7 and nut 9.

The relation between the volume of diffused air and pressure loss was determined as follows: Thus each of an air-diffusing tube (a) made of ceramics, an air-diffusing tube (b) made of a pearl polymerized resin and an air-diffusing tube (c) according to the present invention (each having a pore diameter of 400$\mu$ and 70 dia. × 40 dia. × 250 mm.) was fitted to the diffuser shown in FIG. 2 and was set in a position 2 meters below the water level in the aerating tank 1 shown in FIG. 1. Air was diffused through the tube by varying the volume of air, and the pressure loss through the diffusing tube was measured. The results are shown in FIG. 5.

As apparent from these results, with each of the conventional air-diffusing tubes (a) and (b), when the volume of diffused air was more than 60 liters/min., the pressure loss quickly increased, whereas, with the air-diffusing tube (c) according to the present invention, the variation of the pressure loss was comparatively slow and the pressure loss was considerably low. When the pressure losses in case the volume of air (volume of diffused air) was 100 liters/min. were compared, the pressure loss in the air-diffusing tube (c) of the present invention was about 45-55 percent lower than that each of the conventional air-duffising tubes (a) and (b). This would indicate that the power consumption by the blower can be greatly reduced when the diffusing member of the present invention is employed. This feature is obvious also from the results of measurement of the overall oxygen transfer coefficient which is discussed below.

When an air-diffusing porous tube is used in an actual active sludge method sewage-treating plant, oxygen will be fed (diffused) in the sewage within an aerating tank. In such case, the aerating performance or efficiency of the aerating tank will be greatly influenced by the diffuser. Therefore, in order to compare the aerating performance of the air-diffusing tube according to the present invention with that of the conventional air-diffusing tube made of ceramics, each of the air-diffusing tubes was fitted to the diffuser shown in FIG. 2 to diffuse air in water at a rate of 50 liters/min. at 18° C., and the value of KL$a$ and the pressure loss were measured to determine the value of KL$a$ per 1 mm. Aq of the pressure loss and the oxygen transfer characteristics at a fixed power consumption by the blower. The results are shown in Table 2.

TABLE 2

| Diffuser tube | Value of KL$a$ per mm. Aq of the pressure loss (lit./hr./mm. Aq) |
|---|---|
| Air-diffusing tube of the invention (Example 1). | 0.113 |
| Air-diffusing ceramic tube (conventional | 0.078 |

The overall oxygen transfer coefficient (KL$a$) is a unit showing the oxygen-dissolving performance characteristics (aerating performance) in the aerating tank. The $KLa$ value can be determined by measuring the air-diffusing time, saturated oxygen concentration at the water temperature, initial oxygen concentration and oxygen concentration after the time $t$, in accordance with the following equation:

$$KLa = \frac{2303}{t} \log \frac{Cs-Co}{Cs-Ct}$$

wherein $KLa$: Overall oxygen transfer coefficient.
$t$: Air-diffusing time (hrs.)
$Cs$: Saturated oxygen concentration in p.p.m. at the water temperature.
$Ct$: Initial oxygen concentration in p.p.m.
$Ct$: Oxygen concentration in p.p.m. after the time $t$.

Reference (1):
Eckenfelder, W. W.: Sewage & Industrial Wastes 31, 60-69 (1959).

Reference (2):
Journal of Fermentation Technology Vol. 41, No. 4, 208-227 (1963).

In Table 2 the value of $KLa$ per mm. Aq of the pressure loss is a value of $KLa$ divided by the pressure loss of the diffuser and is a value showing the oxygen-dissolving performance characteristics at a fixed power consumption by the blower. Therefore, from these results, it is obvious that, with the air-diffusing tube according to the present invention, the value of $KLa$ was increased by about 44 percent per unit pressure loss as compared with the value with the conventional air-diffusing tube made of ceramics and the oxygen-feeding efficiency can be greatly increased.

Various porous members for diffusing air of the present invention having various porosities were shaped into a cylindrical air-diffusing tube of 70 dia. × 40 dia. × 250 mm. long, and air was diffused at a volume of diffused air of 100 liters/min. into water with the apparatus of FIG. 1 explained before. The relation of the pressure loss by the air-diffusing tube itself with the variation of the porosity was investigated. The results are shown in FIG. 6. As evident from these results, in the range wherein the porosity is less than 40 percent, the pressure loss increases quickly. Therefore, in order that the pressure loss is reduced, the porosity must be 40-90 percent.

The relation between the compressive strength of the porous air-diffusing member of the present invention and its porosity was investigated. The results are shown in FIG. 7. As apparent from these results, when the porosity is more than 90 percent, the compressive strength will sharply reduce. Therefore, the porosity must be less than 90 percent. However, as before mentioned, in case the porosity is less than 40 percent, the pressure loss will tend to increase. Therefore, it is necessary that the porosity should be 40-90 percent or preferably in the range of 70-85 percent.

The gas- or air-diffusing member of this invention may be used in various manners for diffusing air or gas in a liquid system. Various shapes of the diffuser can be considered depending on the shape and size or capacity of the aerating tank in which the diffuser is used. Since the porous member of the present invention is higher and easier in workability such as cutting and grinding than conventional porous members, it can be shaped into various shapes such as tube or plate as shown in FIGS. 3 or 4.

FIG. 3 is a sectioned side view of a tubular diffuser to which a tubular porous member 5 of the present invention is fitted. The air-diffusing tube 5 held through a packing with an air-diffusing tube holder 10 connected to an air-feeding pipe 3. A cover 14 is fitted to the other end of the tube 5 through a packing 13 by means of a screw cut in the forward end part of a pipe 11, packing 15 and nut 16. An air chamber 20 is defined between the inner wall of the tube 5 and the pipe 11 as shown. Air fed through the air-feeding pipe 3 enters the pipe 11 perforated as at 12 and fixed to the air-diffusing tube holder 10. Through the perforation 12 the air is discharged into the air chamber 20 and is diffused as uniform fine bubbles through the entire surface of the air-diffusing tube 5.

FIG. 4 is a sectional side view of a plate-type diffuser to which a porous member 5 of the present invention is fitted in the form of a plate. An air-diffusing plate holder 17 connected to an air-feeding pipe 3 is box shaped and the air-diffusing plate 5 is fitted to the upper part of the box with bolts 19 and nuts 18. Air fed through the air-feeding pipe 3 will be diffused as uniform fine bubbles through the entire surface of the air-diffusing plate 5 from the air chamber 20.

The porosity and acetalization degree in the present specification were measured as follows:

The porosity $P$ was determined by the following formula by measuring the intrinsic specific gravity $d$ and the weight $W$ of a fixed volume $V$ of the sample (porous body):

$$P = (dV - W)/dV.$$

The acetalization degree was measured as follows. Thus, the amount of the aldehyde bounded to the sample of the polyvinyl acetalic porous body was measured and the acetalization degree was determined thereby.

EXAMPLE 1

4.8 kg. of a polyvinyl alcohol of a polymerization degree of 1,700 and a residual acetic acid group of 0 percent were dissolved in hot water so as to be 40 liters solution. A pasty liquid of a potato starch containing 8.8 kg. was added thereto and the whole was adjusted to be 60 liters by adding water. The mixture was cooled to 50° C. and then 5 kg. of a 70 percent resol-type water-soluble phenol resin (produced by Sumitomo Bakelite Co., Ltd., Japan), 7.7 kg. of 37 percent formalin and 50 percent sulfuric acid were added and stirred. The resulting solution was poured into a reaction vessel (mold) and left standing at 55° C. for 12 hours to conduct an acetalizing reaction. Thus a porous body of a polyvinyl formal modified with the phenol resin was obtained. The acetalization degree of this porous body was 65 percent.

This porous body was washed with water to remove the remaining starch, formalin and sulfuric acid, and dehydrated with a centrifugal dehydrater. Then the body was dried at 80° C. and a curing reaction of the phenol resin was conducted at 120° C. for 5 hours. The thus obtained cylindrical porous body was of a porosity of 87 percent and a phenol resin content of 29.6 percent. An air-diffusing tube made by shaping it to be of 40 dia. × 70 dia. × 250 mm. with a lathe had a pressure loss of 65.2 mm. Aq by itself in water at a rate of air of 100 liters/min. Further, as shown in the above-mentioned Table 1, its compressive strength was 15.3 kg./cm.$^2$ in dry state and 13.8 kg./cm.$^2$ in wet state and was 2–3 times as high as of a conventional polyvinyl acetalic porous body of an acetalization degree of 85 percent (mol) and a porosity of 85 percent.

Further, porous bodies of polyvinyl formals were produced under the same conditions except that 1.0 and 14.0 kg. of the above-mentioned 70 percent resol-type water-soluble resin were respectively added. The resulting porous bodies contained respectively 13.5 and 18.8 percent of said resin based on the polyvinyl formal and had compressive strengths, when wet, respectively of 4.9 and 5.2 kg./cm.$^2$.

Further, porous bodies were produced under the same conditions except that 2.3 and 12.5 kg. of the above-mentioned potato starch were respectively used. The resulting porous bodies were of porosities respectively of 35 and 98 percent, of pressure losses by the air-diffusing tubes respectively of 100 and 68 mm. Aq and of compressive strengths respectively of 20 and 9.5 kg./cm.$^2$.

Further, when any the air-diffusing tubes by the present invention was fitted to the diffuser apparatus as shown in FIG. 3 and used in actual aerating tank for treating sewage for 1 year, the tube was not damaged at all and substantially no reduction of the pressure loss was observed.

EXAMPLE 2

1.3 kg. of 37 percent formalin and 0.8 kg. of 50 percent sulfuric acid were added to a mixture of 6.5 kg. of an aqueous solution of 10 percent polyvinyl alcohol of a polymerization degree of 1,500 and a saponification rate of 99.5 percent and 1.8 kg. of a pasty liquid of a potato starch of a concentration of 10 percent. An acetalizing reaction was conducted at 50° C. for 18 hours in a reaction vessel or mold. After the reaction, a porous body was taken out of the mold, and washed with water to remove remaining formalin and sulfuric acid, and was dried to obtain a porous body of a polyvinyl formal of an acetalization degree of 62 percent.

Then the body was dipped in an aqueous solution containing 40 percent trimethylolmelamine and 8 percent magnesium chloride for 1 hour. The body was squeezed to a liquid pickup of 100 percent, and dried. The dried body was then subjected to curing reaction at 120° C. for 20 minutes.

The resulting porous body contained 40.0 percent by weight of the melamine resin and was of a porosity of 74.6 percent. An air-diffusing tube made by shaping this porous body to be of 40 dia. × 70 dia. × 250 mm. long with a lathe had a pressure loss of 69.7 mm. Aq by itself in water at an air feed rate of 100 liters/min. and of a compressive strength of 13.3 kg./cm.$^2$.

When the same process was repeated except that a dimethylolated hydroxyethylene resin was used instead of the above-mentioned trimethylolmelamine, there was obtained a porous body of a polyvinylformal containing 40.5 percent by weight of said resin and having a porosity of 74.8 percent. The pressure loss of an air-diffusing tube shaped therefrom in the same manner as mentioned above was 69.0 mm. Aq. The compressive strength in wet state was 14.0 kg./cm.$^2$.

EXAMPLE 3

The polyvinyl acetalic porous body of an acetalization degree of 62 percent obtained in Example 2 was dipped in a mixed solution of a 25 percent xylol solution of a bisphenol A-epichlorohydrin type epoxy resin (Epicoat No. 828 produced by Shell Chemical Co.) and triethylene tetramine. The wet body was centrifuged to a liquid pickup of 100 percent by a centrifugal dehydrater and then the curing reaction was conducted at 90° C. for 1 hour. The resulting porous body was of a porosity of 81.5 percent, a resin content of 24.8 percent by weight and a compressive strength of 13.9 kg./cm.$^2$ in wet state. When an air-diffusing plate made by shaping this porous body was fitted to the holder as shown in FIG. 4 and was used in an actual aerating tank for treating sewage for one year, it was not damaged or broken at all. The pressure loss (in water) after the one year use was 62.5 mm. Aq and there was observed no substantial reduction.

EXAMPLE 4

The same process as in Example 1 was repeated except that the following mixed solution was added instead of the 70 percent resol type water-soluble phenol resin in Example 1. Thus 0.7 kg. of Versamid No. 215 (a polyamide of a dimer acid produced by General Mills Inc.) and 0.3 kg. of acetic acid were uniformly dispersed in 4 kg. of water. Then 0.16 kg. of 2-ethyl hexylate of trisdimethylaminomethylphenol and 3 kg. of glycerol diglycidyl ether were added to the dispersion and were stirred to prepare a mixed solution. The total amount of this mixed solution was added to the aqueous solution of the polyvinyl alcohol in Example 1 and was well stirred. Then, in the same manner as in Example 1, formalin and sulfuric acid were mixed therein to conduct an acetalizing reaction and a curing reaction of the epoxy resin. The resulting porous body was of an acetalization degree of 63 percent (mol), a porosity of 86 percent and an epoxy resin content of 28.7 percent by weight. The pressure loss by an air-diffusing tube made by shaping it in the same manner as in Example 1 was 66.0 mm. Aq. Its compressive strength was 13.5 kg./cm.$^2$ when wet and 15.0 kg./cm.$^2$ when dry.

What we claim is:

1. A porous solid member for diffusing gas or air into a liquid system which comprises a porous body of polyvinyl acetal of an acetalization degree of 60–85 percent (mol), said body further containing 15–150 percent by weight (based on the polyvinyl acetal) of at least one cured resin selected from the group consisting of phenol-formaldehyde resins, melamine-formaldehyde resins, urea-formaldehyde resins and epoxy resins, formed from a member selected from the group consisting of bisphenol-epichlorohydrin precondensates, epoxylated polyolefins, diglycidyl ethers of polyethylene glycols, diglycidyl ethers of polypropylene glycols, diglycidyl ethers of bisphenol A, 1,10-dimethoxy-3,4,7,8-diepoxydecane and 2,6-diglycidyl phenylglycidyl ether, said body having continuous fine pores with a porosity of 40–90 percent.

2. A porous solid member as claimed in claim 1 wherein said cured resin is present in the polyvinyl acetal body as previously mixed therewith.

3. A porous solid member as claimed in claim 1 wherein said cured resin is present in the polyvinyl acetal body as previously impregnated and cured therein.

4. A method of producing a porous solid member of claim 3 which comprises heating a mixture of an aqueous solution of polyvinyl alcohol, an aldehyde, an acetalization acid catalyst and a pore-producing agent selected from starch and dextrin at a temperature of 30°–70° C. for 10–30 hours to obtain a solid porous polyvinyl acetal body having a porosity of 40–90 percent and an acetalization degree of 60–84 percent (mol), washing and drying the same, impregnating the porous polyvinyl acetal body with a solution of a precondensate or monomer of curable resin selected from the group consisting of phenol-formaldehyde resins, melamine-formaldehyde resins, urea-formaldehyde resins and epoxy resins formed from a member selected from the group consisting of bisphenol-epichlorohydrin precondensates, epoxylated polyolefins, diglycidyl ethers of polyethylene glycols, diglycidyl ethers of polypropylene glycols, diglycidyl ethers of bisphenol A, 1,10-dimethoxy-3,4,7,8-diepoxydecane and 2,6-diglycidyl phenylglycidyl ether, and a curing catalyst therefor, and then heating the impregnated porous body at 60°–150° C.

5. A method of producing a porous solid member of claim 2 which comprises mixing an aqueous solution of polyvinyl alcohol, an aldehyde, an acid catalyst, a pore-producing agent selected from starch and dextrin, and a precondensate or monomer of curable resin selected from the group consisting of phenol-formaldehyde resins, melamine-formaldehyde resins, urea-formaldehyde resins and epoxy resins, formed from a member selected from the group consisting of bisphenol-epichlorohydrin precondensates, epoxylated polyolefins, diglycidyl ethers of polyethylene glycols, diglycidyl ethers of polypropylene glycols, diglycidyl ether of bisphenol A, 1,10-dimethoxy-3,4,7,8 diepoxydecane and 2,6-diglycidyl phenylglycidyl phenylglycidyl ether, heating the mixture at 30°–70° C. for 10–30 hours to conduct the acetalizaton and curing of the resin, and then washing and drying the resulting solid porous body.

6. A method according to claim 4 wherein the aldehyde is selected from the group consisting of formaldehyde, acetaldehyde, butylaldehyde, 2-ethylhexylaldehyde, laurylaldehyde, glyoxal and benzaldehyde.

7. A method according to claim 5 wherein the aldehyde is selected from the group consisting of formaldehyde, acetaldehyde, butylaldehyde, 2-ethylhexylaldehyde, laurylaldehyde, glyoxal and benzaldehyde.

8. A porous solid member according to claim 1, wherein the cured resin is a phenol-formaldehyde resin.

9. A porous solid member according to claim 1 wherein the resin is a melamine-formaldehyde resin.

10. A porous solid member according to claim 1 wherein the cured resin is a urea-formaldehyde resin.

* * * * *